United States Patent
Yoon et al.

(10) Patent No.: US 9,189,008 B1
(45) Date of Patent: Nov. 17, 2015

(54) APPARATUS FOR INTERACTING WITH EXTERNAL DEVICE BY USING PEDAL MODULE

(71) Applicant: Center Of Human-Centered Interaction For Coexistence, Seoul (KR)

(72) Inventors: Dae Keun Yoon, Seoul (KR); Kwang Kyu Lee, Gyeonggi-do (KR); Shin Young Kim, Seoul (KR); Jai Hi Cho, Seoul (KR); Bum Jae You, Seoul (KR)

(73) Assignee: Center Of Human-Centered Interaction For Coexistence, Seoul (KR)

( * ) Notice: Subject to any disclaimer, the term of this patent is extended or adjusted under 35 U.S.C. 154(b) by 0 days.

(21) Appl. No.: 14/573,440

(22) Filed: Dec. 17, 2014

(30) Foreign Application Priority Data

Sep. 2, 2014 (KR) .................... 10-2014-0116505

(51) Int. Cl.
*G05B 15/00* (2006.01)
*G05G 1/34* (2008.04)
*G05G 11/00* (2006.01)

(52) U.S. Cl.
CPC . *G05G 1/34* (2013.01); *G05G 11/00* (2013.01)

(58) Field of Classification Search
USPC .......................... 700/245, 258, 302
See application file for complete search history.

(56) References Cited

U.S. PATENT DOCUMENTS

| | | | | |
|---|---|---|---|---|
| 5,049,079 A | * | 9/1991 | Furtado | A63B 69/18 434/253 |
| 5,745,055 A | * | 4/1998 | Redlich | G06F 3/03548 341/20 |
| 6,213,564 B1 | * | 4/2001 | Face, Jr. | B60T 7/042 188/158 |
| 7,309,829 B1 | * | 12/2007 | Ludwig | G10H 1/00 84/609 |

* cited by examiner

*Primary Examiner* — Ronnie Mancho
(74) *Attorney, Agent, or Firm* — Husch Blackwell LLP

(57) ABSTRACT

An apparatus interacting with an external device by using a pedal module is provided. The apparatus includes: a pedal module; a parallel position-measuring sensor for sensing a degree of a parallel motion; a rotary position-measuring sensor for sensing a degree of a rotary motion; and a control part for ordering the external device to be driven by referring to at least either of the degree of the parallel motion sensed by the parallel position-measuring sensor or that of the rotary motion sensed by the rotary position-measuring sensor or for receiving a control signal from the external device and driving a motor group including at least one motor to apply force feedback to the pedal module by referring to the control signal.

14 Claims, 6 Drawing Sheets

APPARATUS FOR INTERACTING WITH EXTERNAL DEVICE BY USING PEDAL MODULE

CROSS REFERENCE TO RELATED APPLICATION

This application claims priority to and incorporates herein by reference all disclosure in Korean Patent Application No. 10-2014-0116505 filed Sep. 2, 2014.

FIELD OF THE INVENTION

The present invention relates to an apparatus for interacting with an external device by using a pedal module; and more particularly, to the apparatus including a pedal module having a left foot pedal on which a user's left foot is placed and a right foot pedal on which the user's right foot is placed, a parallel position-measuring sensor for sensing a degree of parallel motion when the pedal module is moved in the parallel motion by manipulating the left and the right foot pedals; a rotary position-measuring sensor for sensing a degree of rotary motion when the pedal module is moved in the rotary motion by manipulating the left and the right foot pedals; and a control part for ordering the external device to be driven or for receiving a control signal from the external device and driving a motor to give force feedback to the left and/or the right foot pedals by referring to the control signal by referring to at least either of the degree of the parallel motion sensed by the parallel position-measuring sensor or the degree of the rotary motion sensed by the rotary position-measuring sensor.

BACKGROUND OF THE INVENTION

A conventional apparatus, interacting with an external device by using an existing pedal module, may use force-measuring sensors such as a force torque (FT) sensor to measure the magnitude of force inputted by a user, but such sensors, which are high-priced devices, may cause considerable cost burdens of manufacturers. In addition, with the existing pedal module, it is not easy to make a communication more realistically with a remote device and receiving force feedback is nothing but the delivery of the force.

Therefore, the inventor intends to propose an apparatus which can interact more realistically with an external device by using a pedal module.

SUMMARY OF THE INVENTION

It is an object of the present invention to solve all the problems mentioned above.

It is another object of the present invention to interact more effectively with an external device by manipulating a pedal module.

It is still another object of the present invention to provide a low-priced interacting apparatus that has a structure of delivering a force feedback to a user by using spring stiffness instead of using a high-priced FT sensor or a high-priced torque sensor.

It is still yet another object of the present invention to control a parallel motion and a rotary motion by intuitively controlling a mobile platform device that has differential types of wheels and enabling the user to control the device by using the user's two feet without using the user's upper body.

In accordance with one aspect of the present invention, there is provided an apparatus interacting with an external device by using a pedal module, including: a pedal module including a left foot pedal on which the left foot of a user is placed and a right foot pedal on which the right foot of the user is placed; a parallel position-measuring sensor for sensing a degree of a parallel motion if the user manipulates the left and the right foot pedals to move the pedal module in the parallel motion; a rotary position-measuring sensor for sensing a degree of a rotary motion if the user manipulates the left and the right foot pedals to move the pedal module in the rotary motion; and a control part for ordering the external device to be driven by referring to at least either of the degree of the parallel motion sensed by the parallel position-measuring sensor or that of the rotary motion sensed by the rotary position-measuring sensor or for receiving a control signal from the external device and driving a motor group including at least one motor to apply force feedback to either of the left and the right foot pedals by referring to the control signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
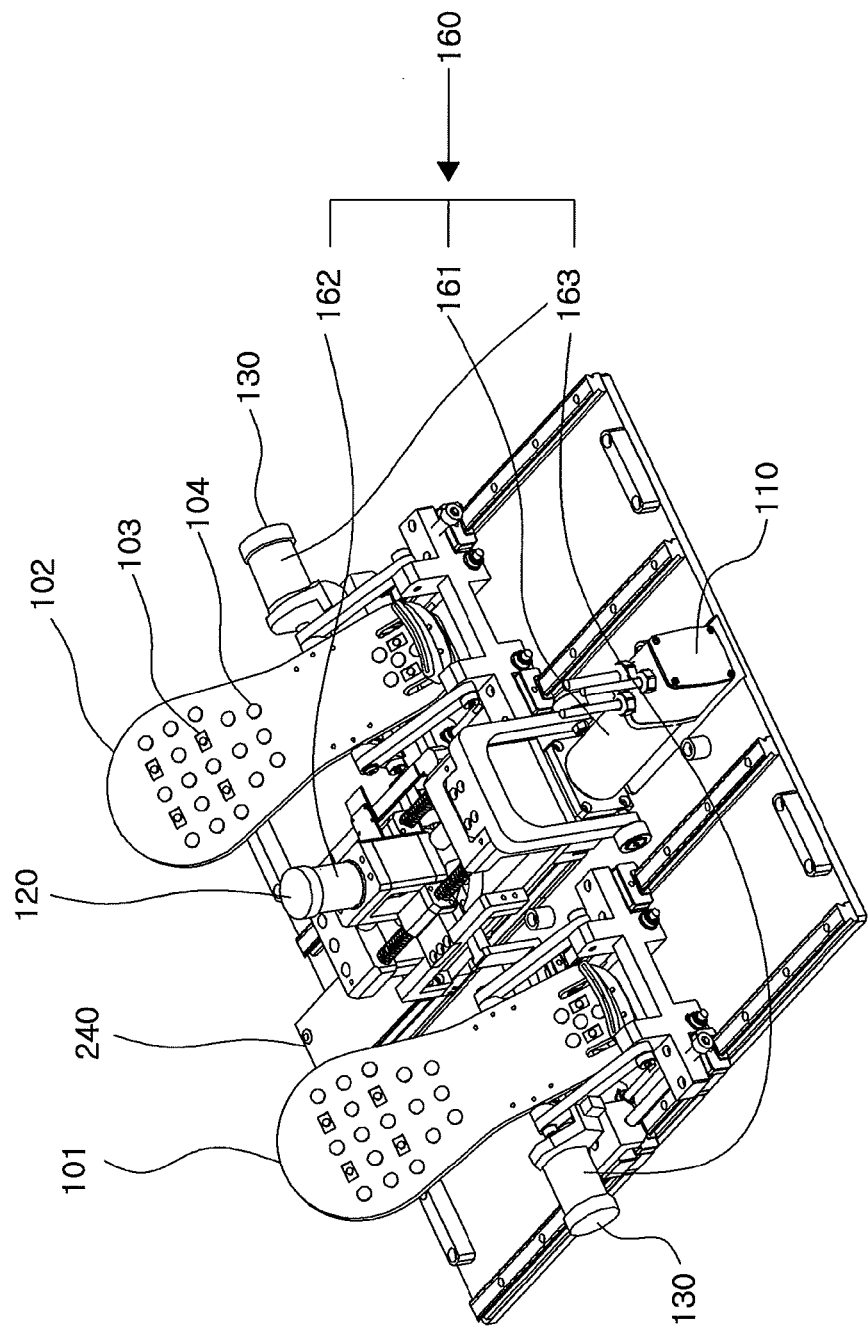
FIG. 1 is a perspective view of an apparatus manipulated by both feet in accordance with the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled.

In the drawings, like numerals refer to the same or similar functionality throughout the several views.

To allow those skilled in the art to the present invention to be carried out easily, the example embodiments of the present invention by referring to attached diagrams will be explained in detail as follows:

The Whole Configuration

FIG. 1 is a perspective view of an apparatus manipulated by both feet in accordance with the present invention.

In accordance with one example embodiment of the present invention, an apparatus 100, which can interact with an external device and manipulated by both feet, includes a left foot pedal 101 where a user may place the user's left foot and a right foot pedal 202 where the user may place the user's right foot (for convenience, the left foot pedal 101 and the right foot pedal 102 are referred to as a pedal module in this specification). Further, each of the left foot pedal 101 and the right foot pedal 102 can move independently by being manipulated by the user's feet. Because rails are installed in parallel on the bottom part of the apparatus 100, the left foot pedal 101 and the right foot pedal 102 can move on the rails. For example, if the user moves the left foot pedal 101 and the right foot pedal 102 in parallel forwards or backwards by putting force on two feet, the apparatus 100 may move in parallel on the rails. Also, if the user induces a rotary motion by putting force on the left and the right feet clockwise or counterclockwise, the left foot pedal 101 and the right foot pedal 102 of the apparatus 100 may perform the rotary motion. In addition, if the user manipulates a degree of tilt of the left foot pedal 101 and the right foot pedal 102 by using the user's left and right foot, as the case may be, the left foot pedal 101 and the right foot pedal 102 of the apparatus 100 may perform the tilting motion. In the present invention, it is made sure that the tilting motion, i.e., a tilting motion in FIG. 6 to be explained later, is not certainly necessary to be performed.

To measure displacement of the left foot pedal 101 and the right foot pedal 102 when the user manipulates the parallel motion, the rotary motion, and the tilting motion of the apparatus 100, a parallel position-measuring sensor 110, a rotary position-measuring sensor 120, and a tilting position-measuring sensor 130, respectively, may be used. The parallel position-measuring sensor 110, the rotary position-measuring sensor 120, and the tilting position-measuring sensor 130 may include respective corresponding encoders, which are converters for converting analog values such as an amount of the parallel motion, an amount of the rotary motion, and an amount of the tilting motion to digital ones as electric signals. The encoders may deliver displacement values caused by the parallel motion, the rotary motion, and the tilting motion of the apparatus 100 as digital values to the external device to support the user to thereby allow the user to deliver a command corresponding to motion values, i.e., the displacement values, to the external device.

As shown in FIG. 1, at least some of pressure sensors 103 and vibration motors 104 may be formed on the left foot pedal 101 and the right foot pedal 102 of the apparatus 100. If the user puts pressure on the left foot pedal 101 and the right foot pedal 102 by using the user's feet, the pressure sensor 103 may deliver a pressure value to a control part (non-illustrated) by measuring a magnitude of the pressure value and then the control part may control the external device by delivering the measured the magnitude of the pressure value to the external device. Further, the vibration motor 104 generates vibration to the left foot pedal 101 and/or the right foot pedal 102 depending on a control signal corresponding to information on a degree of vibration received from the external device through the control part. Accordingly, the user is allowed to feel a state of the other user who is controlling the external device such as a manned robot or the external device itself such as an unmanned robot.

In addition, if there are multiple pressure sensors 103 on the left foot pedal 101 and the right foot pedal 102 and the user puts the pressure with a various distribution on the left foot pedal 101 and the right foot pedal 102 by using the user's feet, the pressure sensors 103 may acquire information on the distribution of pressure magnitudes and the control part may deliver the acquired information to the external device to thereby control the motion of the external device accordingly.

Besides, if there are multiple vibration motors 104 on the left foot pedal 101 and the right foot pedal 102, the vibration motors 104 may deliver a force feedback to the user by providing vibration differentially to each part of the left foot pedal 101 and the right foot pedal 102 depending on the information on a distribution of pressure magnitudes included in a control signal received from the external device through the control part.

In an environment where the external device moves, information on the condition of the surface of a road on which the external device is moving could be outputted through the multiple vibration motors 104 on the left foot pedal 101 and the right foot pedal 102 by referring to the control signal to thereby allow the user to feel the current condition of the road surface on which the external device is moving by vibration. Further, the condition of the road surface may be patterned according to the order the multiple vibration motors 104 are driven to thereby allow the user to feel the condition of the road surface on which the external device is moving by vibration with various patterns.

The control part and the control signal were not illustrated. However, the control part may be included in the apparatus 100 or it out of the apparatus 100 may be operated to interact with the apparatus 100. Further, the control signal may represent a signal including information on values according to a motion of the external device or an environment of the external device, etc.

Figure 2:
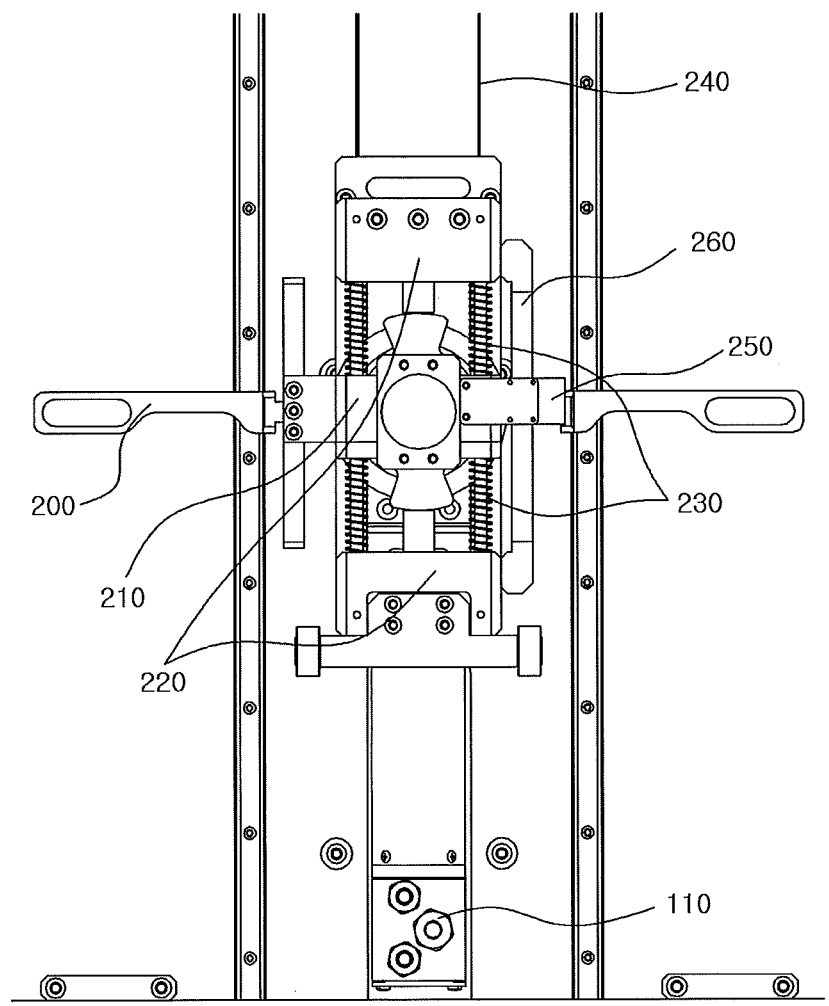
FIG. 2 is a plan showing a configuration of parallel motion of the apparatus manipulated by both feet in accordance with the present invention.

FIG. 2 is a plan showing a configuration of parallel motion of the apparatus in accordance with the present invention.

By referring to FIG. 2, if the user manipulates the left foot pedal 101 and the right foot pedal 102 to allow the apparatus 100 (i.e., the pedal module of the apparatus 100) to be moved in parallel motion to thereby interact with the external device, rotary rods 200, a parallel motion part 210, a parallel stopper part 220, at least one first spring 230, a one-shaft linear actuator 240, and the parallel position-measuring sensor 110 may be included in the apparatus 100 to sense the degree of parallel motion.

The rotary rods 200 may be installed with vertical symmetry as shown in FIG. 2. Respective one ends of the rotary rods 200 are fixed to the left foot pedal 101 and the right foot pedal 102 and the other ends thereof are combined with the parallel motion part 210. For example, if the user manipulates the left foot pedal 101 and the right foot pedal 102 to allow the apparatus 100 to be moved in the parallel motion, the rotary rods 200 connected with the left foot pedal 101 and the right foot pedal 102 may receive a force toward a direction where the user puts a force on the apparatus 100 and accordingly the parallel motion part 210 may receive a force toward the direction where the user puts the force. Besides, the parallel motion part 210 and the parallel stopper part 220 may be connected through the first spring 230. If the parallel stopper part 220 is fixed and the user moves the rotary rods 200 in parallel, the rotary rods 200, i.e., the user's feet, may receive the force of the first spring 230 connected to the parallel motion part 210. If the compressed length of the first spring 230 becomes longer, they will receive greater force. At the time, the received force may be measured by using a parallel position-measuring sensor 250 and a magnetic band 260.

If the parallel stopper part 220 moves in the parallel motion, a ball screw in the one-shaft linear actuator 240 connected with the parallel stopper part 220 converts the parallel motion into a rotary one. Accordingly, an amount of the rotary motion of the ball screw is delivered to the parallel position-measuring sensor 110 connected with the one-shaft linear actuator 240. Thereafter, if the parallel position-measuring sensor 110 delivers information on the degree of the parallel motion to the external device by converting the analog value of the amount of the rotary motion to digital value thereof, the external device may be controlled remotely.

Figure 3:
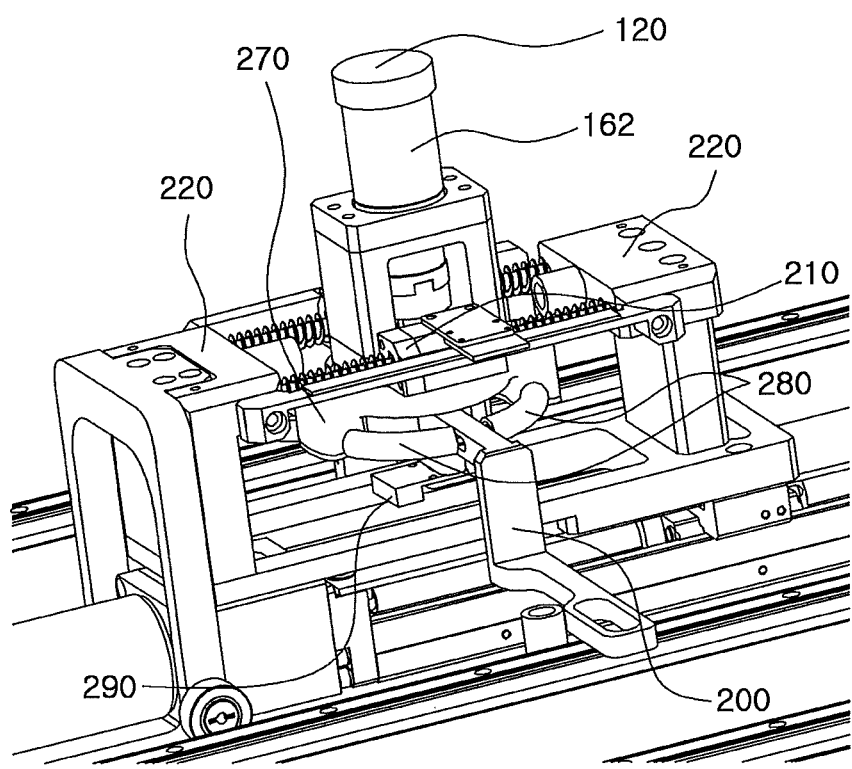
FIG. 3 is a perspective view showing a configuration of rotary motion of the apparatus manipulated by both feet in accordance with the present invention.

FIG. 3 is a perspective view showing a configuration of rotary motion of the apparatus manipulated by both feet in accordance with the present invention.

By referring to FIG. 3, if the user manipulates the left foot pedal 101 and the right foot pedal 102 clockwise or counter-clockwise by using the user's left and right feet upon the interaction with the external device to thereby move the apparatus 100 (i.e., the pedal module of the apparatus 100) in the rotary motion, the rotary rods 200 connected with the left foot pedal 101 and the right foot pedal 102 may rotate towards a direction to which the user puts force around a rotation shaft (i.e., a shaft installed in a direction to which a central part of a rotary motion motor 162 is penetrated). Herein, the rotary rods 200 and a rotary stopper part 270 are connected through a second spring 280. If the rotary stopper part 270 is fixed and the user rotates the rotary rods 200, the rotary rods 200, i.e., the user's feet, may receive force of the second spring 280 connected with the rotary stopper part 270 and accordingly the force received through the second spring 280 may be measured through a rotation angle sensor 290.

If the rotary stopper part 270 is moved in the rotary motion, the rotary position-measuring sensor 120 may convert an amount of the rotary motion as an analog value to that as a digital value and deliver the amount of the rotary motion as the digital value to the external device. Accordingly, the rotary motion of the external device can be controlled.

If it becomes difficult to move the external device due to a slope, an obstacle or any other circumstances, the external device may send a control signal including information on the slope, the obstacle or any other circumstances. Thereafter, the control part of the apparatus 100 may receive the control signal and accordingly provide the user with force feedback by controlling at least some of the parallel motion motor 161, the rotary motion motor 162, and the tilting motion motor 163 as illustrated in FIG. 1. For example, if the control signal including information on the obstacle around the external device is received through the control part, a motor group 160 may be driven to make the force feedback apply to at least either of the left foot pedal 101 and the right foot pedal 102 by referring to the control signal. If the motor group 160 is driven, the user may feel that there is an obstacle or a slope near the external device with the force feedback. If the external device is closer to the obstacle, it could make the motor work to give greater force feedback to the user.

Figure 4:
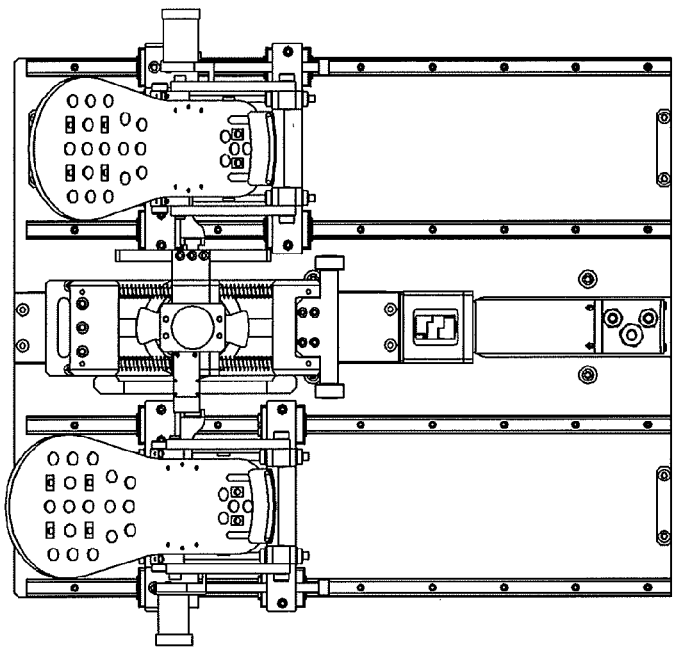
FIG. 4 is a plan showing an example embodiment of position change depending on the parallel motion of a pedal module in accordance with the present invention.
Figure 4:
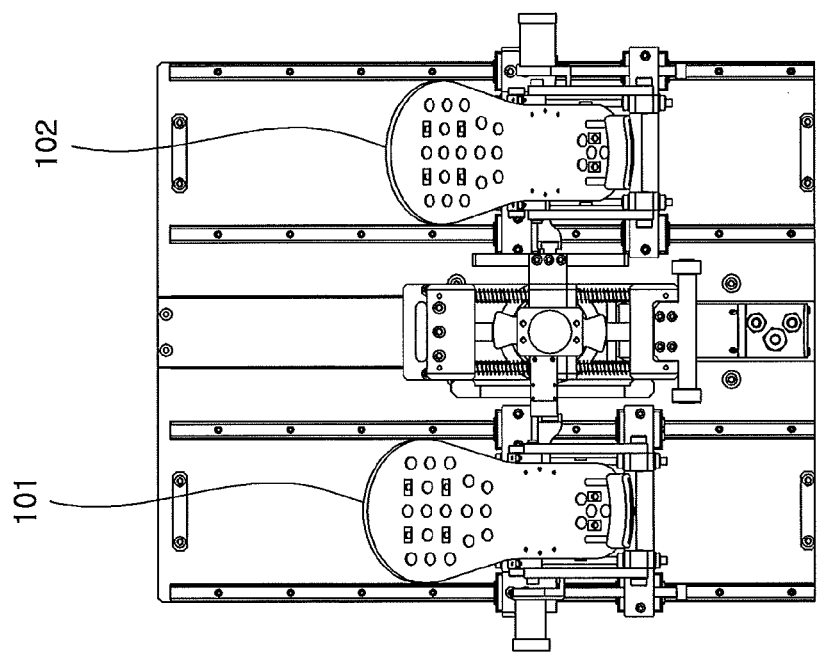

FIG. 4 is a plan showing an example embodiment of position change depending on the parallel motion of the pedal module in accordance with the present invention.

Figure 5:
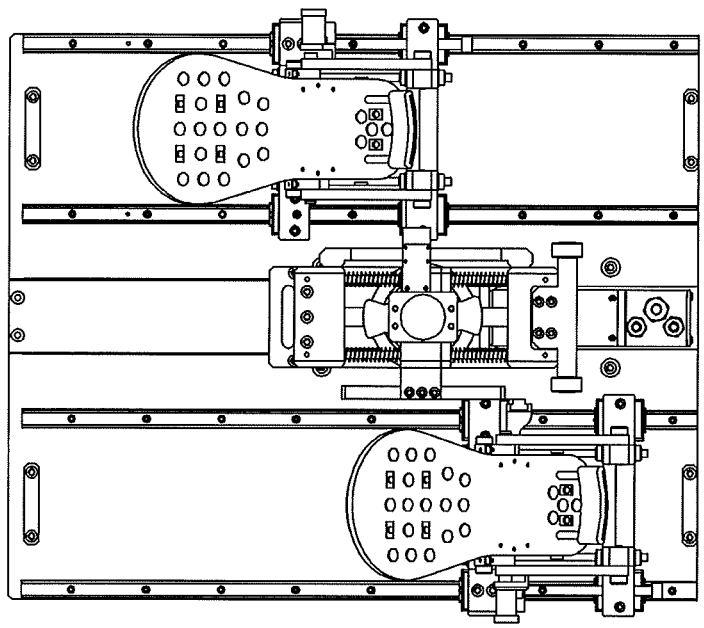
FIG. 5 is a plan showing an example embodiment of position change depending on the rotary motion of the pedal module in accordance with the present invention.
Figure 5:
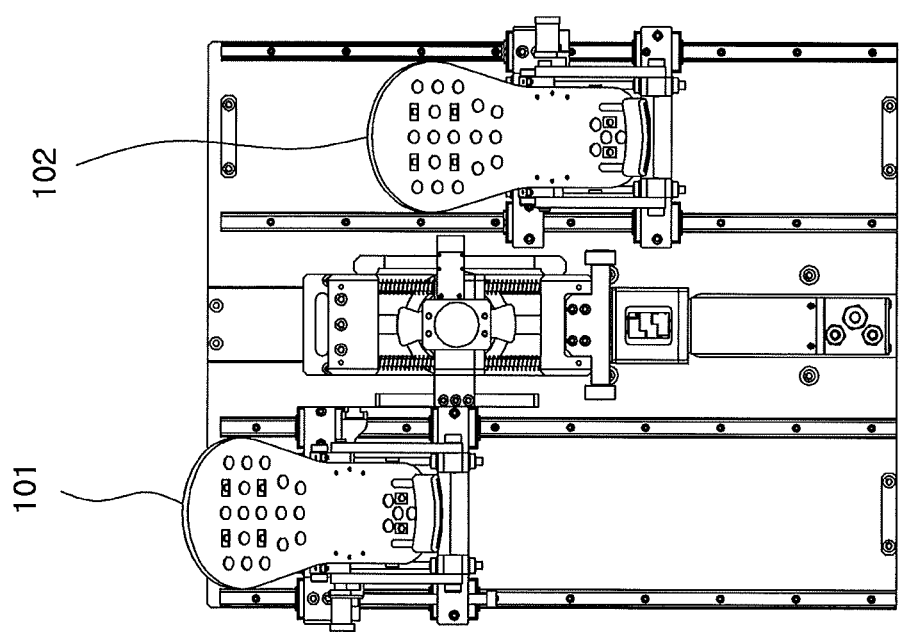

FIG. 5 is a plan showing an example embodiment of position change depending on the rotary motion of the pedal module in accordance with the present invention.

Figure 6:
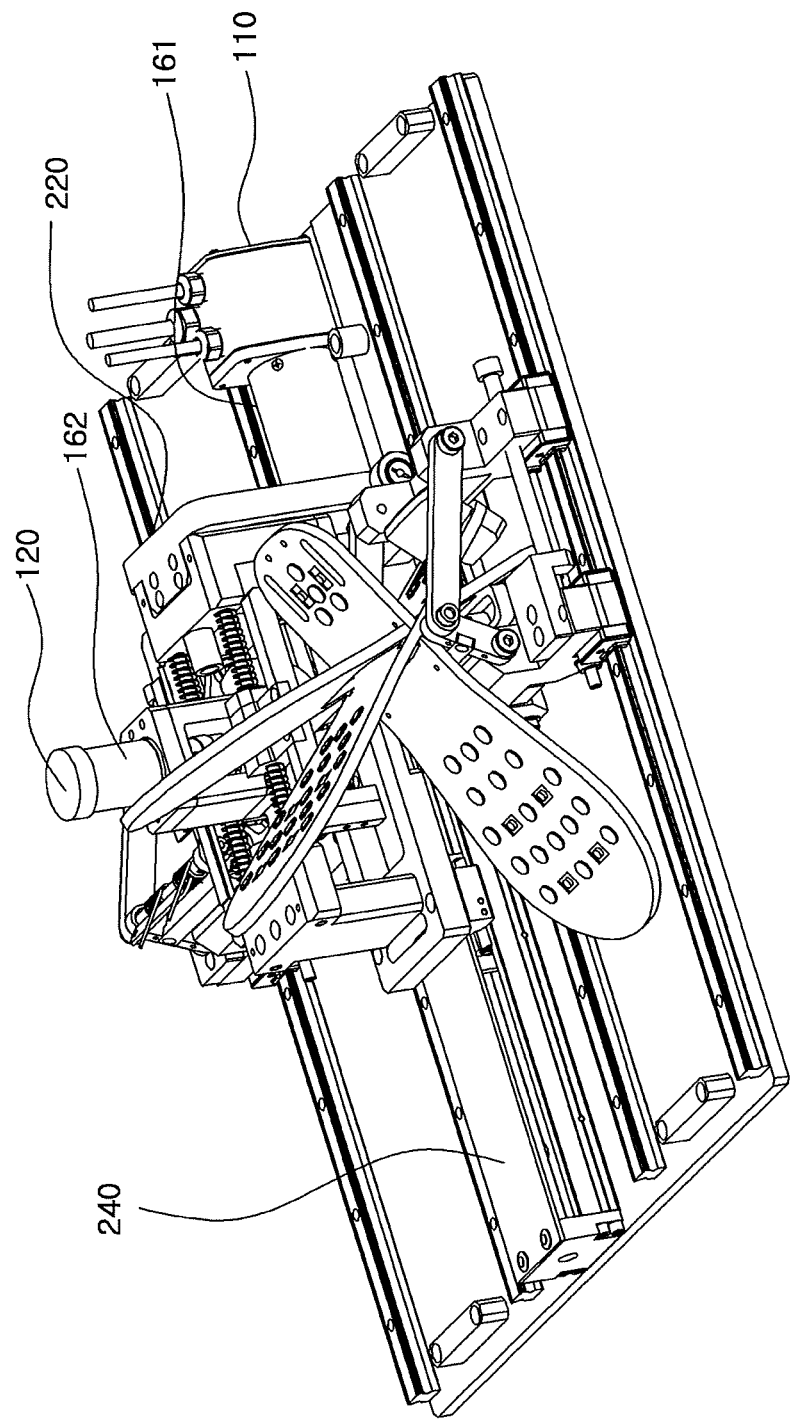
FIG. 6 is a plan showing an example embodiment of position change depending on a tilting motion of the pedal module in accordance with the present invention.

FIG. 6 is a plan showing an example embodiment of position change depending on tilting motion of the pedal module in accordance with the present invention.

By referring to FIG. 6, if the user manipulates the left foot pedal 101 and the right foot pedal 102 clockwise or counter-clockwise by using the user's left and right feet upon the interaction with the external device to thereby move the apparatus 100 (i.e., the pedal module of the apparatus 100) in the tilting motion independently, the external device may be controlled by measuring a degree of the tilting motion. For example, if the user puts force to move the left foot pedal 101 in the tilting motion, the tilting position-measuring sensor 130 measures the degree of the tilting motion and converts an amount of the tilting motion as an analog value to that as a digital value. Thereafter, the tilting position-measuring sensor 130 delivers the amount of the titling motion to the external device. Accordingly, the user may control the external device remotely in the direction where the user controls the tilting motion of the apparatus 100.

The external device which may interact with the apparatus 100 may be an unmanned or manned robot. Herein, it could be introduced that a manned robot may be operated by the other user, in which case, the external device (i.e., the manned robot) has the same structure as the apparatus 100.

First of all, if the external device interacting with the apparatus 100 is an unmanned robot, the force feedback may be provided to the user to express information on an obstacle, a slope, etc. around the robot while the user is controlling the unmanned robot at a remote place through a mechanism for the force feedback. For instance, if the user manipulates the pedal module of the apparatus 100 to move it in parallel motion, the unmanned robot moves in the parallel motion at the remote place. If there is an obstacle in front of the unmanned robot, the apparatus 100 would drive the motor group 160 to deliver force feedback to a direction opposite to that of the parallel motion driven by the user. For reference, if the strength of the force feedback becomes greater, it may represent that the obstacle becomes closer to the unmanned robot at the remote place. As mentioned above, there could be multiple vibration motors 104 attached to the pedal module. Thus, information on a surface of the ground on which the unmanned robot is moving could be expressed by vibration patterns of the vibration motors 104.

Next, if the external device interacting with the apparatus 100 is a manned robot, information on the driving of the apparatus 100 or the external device, information on the sense of the feet of two users, etc. may be exchanged.

On assumption that the two users who use the present invention are A and B, if the user A moves the pedal module of the apparatus 100 in the parallel motion and the rotary motion and steps or taps lightly the pedal module with both feet, various sensors, such as the pressure sensor 103 attached to the foot pedals, the parallel position-measuring sensor 110, the rotary position-measuring sensor 120, and the tilting position-measuring sensor 130, may receive information on the driving state of the user A and deliver the information to the external device of the user B which has the same structure as the apparatus 100 of the user A. The information delivered by the apparatus 100 of the user A is converted and outputted to a motor group 160 and a vibration motor 104 attached to the foot pedal of the external device of the user B. Because the user B may feel information on the driving state, foot pressure, and touching of the user A, the two users, therefore, may share the driving information and the foot sense information.

In accordance with the present invention, an external device may be controlled more intuitively by using pedals than by the existing apparatuses interacting with the external device.

In addition, the present invention achieves the effect of configuring and providing the same apparatus at a low price to the user than the method for using a high-priced FT sensor or torque sensor.

In accordance with the present invention, users who use the apparatuses by pressure sensors and vibration motors may communicate more realistically.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. An apparatus interacting with an external device by using a pedal module, comprising:
    a pedal module including a left foot pedal on which the left foot of a user is placed and a right foot pedal on which the right foot of the user is placed;
    a parallel position-measuring sensor for sensing a degree of a parallel motion if the user manipulates the left and the right foot pedals to move the pedal module in the parallel motion;
    a rotary position-measuring sensor for sensing a degree of a rotary motion if the user manipulates the left and the right foot pedals to move the pedal module in the rotary motion; and
    a control part for ordering the external device to be driven by referring to at least either of the degree of the parallel motion sensed by the parallel position-measuring sensor or that of the rotary motion sensed by the rotary position-measuring sensor or for receiving a control signal from the external device and driving a motor group including at least one motor to apply force feedback to either of the left and the right foot pedals by referring to the control signal.

2. The apparatus of claim 1, further comprising a tilting position-measuring sensor for sensing a degree of a tilting motion if the user manipulates the left and the right foot pedals to move the pedal module in the tilting motion.

3. The apparatus of claim 2, wherein the control part orders the external device to be driven by additionally referring to the degree of the tilting motion sensed by the tilting position-measuring sensor.

4. The apparatus of claim 1, wherein the motor group includes: a parallel motion motor for allowing a parallel stopper part interacting with a one-shaft linear actuator to perform parallel motion by driving the one-shaft linear actuator; and wherein a parallel motion part connected with the pedal module through rotary rods and the parallel stopper part are connected through at least one first spring.

5. The apparatus of claim 4, wherein the motor group further includes: a rotary motion motor fixed to the parallel motion part; and wherein, if the rotary motion motor is driven, a rotary stopper part interacting with the rotary motion motor is moved in the rotary motion and the rotary stopper part and the rotary rods are connected through a second spring.

6. The apparatus of claim 1, wherein the external device is manipulated by the other user.

7. The apparatus of claim 6, wherein the external device includes the same structure as the apparatus interacting therewith.

8. The apparatus of claim 1, wherein the external device is an unmanned robot.

9. The apparatus of claim 8, wherein the control signal is generated by referring to at least either of information on an obstacle or a slope included in an environment where the unmanned robot moves.

10. The apparatus of claim 9, wherein the control signal includes a signal for ordering the control part of the apparatus interacting with the external device to provide greater force feedback to at least either of the left and the right foot pedals when the unmanned robot is closer to the obstacle.

11. The apparatus of claim 1, wherein the left and the right foot pedals have at least one pressure sensor and at least one vibration motor thereon; wherein the pressure sensor measures pressure magnitude if the user puts the pressure with his or her feet on the left and the right foot pedals and the control part delivers the measured pressure magnitude to the external device; and wherein the vibration motor causes the left and the right foot pedals to vibrate according to the control signal received from the external device through the control part.

12. The apparatus of claim 11, wherein the left and right foot pedals have multiple pressure sensors and multiple vibration motors thereon; wherein the multiple pressure sensors acquire information on the pressure magnitude distribution when the user puts the pressure on the left and right foot pedals with his or her feet on the left and the right foot pedals, and the control part delivers the acquired information on pressure magnitude distribution to the external device; and wherein the multiple vibration motors cause the left and the right foot pedals to vibrate differentially according to the pressure distribution information included in the control signal received from the external device through the control part.

13. The apparatus of claim 12, wherein information on a road surface included in an environment where the external device is moving is outputted through the multiple vibration motors.

14. The apparatus of claim 13, wherein information on the road surface included in the environment where the external device is moving is outputted in order the multiple vibration motors are driven.

* * * * *